United States Patent [19]

Heppner

[11] Patent Number: 4,905,466
[45] Date of Patent: Mar. 6, 1990

[54] WINDROW MOVER

[76] Inventor: Alden Heppner, Box 348, Lac La Biche, Alberta, Canada, T0A 2C0

[21] Appl. No.: 231,783

[22] Filed: Aug. 12, 1988

[51] Int. Cl.⁴ .............................................. A01D 78/06
[52] U.S. Cl. ...................................... 56/364; 56/15.1; 56/370; 56/372; 56/DIG. 21; 198/813; 198/842
[58] Field of Search ........................ 56/15.1, 15.5, 192, 56/345, 350, 364, 370, 372, DIG. 21; 198/813, 840, 842, 836

[56] References Cited

U.S. PATENT DOCUMENTS

| 3,059,403 | 10/1962 | Banford et al. | 56/366 |
| 3,111,779 | 11/1963 | Ulrich | 198/842 X |
| 3,122,935 | 3/1964 | Morling | 198/842 X |
| 3,178,876 | 4/1965 | Lundberg | 56/372 |
| 3,472,010 | 10/1969 | Hagborg | 56/370 |
| 3,702,052 | 11/1972 | Klassen | 56/370 |
| 3,921,793 | 11/1975 | Hutchinson | 198/813 |
| 4,288,972 | 9/1981 | Rostoucher | 56/370 |
| 4,403,468 | 9/1983 | Yoder | 56/370 |
| 4,471,605 | 9/1984 | Eader | 56/372 |
| 4,519,194 | 5/1985 | Aron et al. | 56/370 |
| 4,524,575 | 6/1985 | Nilsen | 56/372 |
| 4,739,610 | 4/1988 | Schultz | 56/192 X |
| 4,793,125 | 12/1988 | Ehrhart et al. | 56/364 X |

FOREIGN PATENT DOCUMENTS

| 588818 | 12/1959 | Canada . | |
| 721018 | 11/1965 | Canada | 56/93 |
| 728877 | 3/1966 | Canada | 56/93 |
| 934985 | 6/1982 | U.S.S.R. . | |

Primary Examiner—Stephen J. Novosad
Assistant Examiner—David J. Bagnell
Attorney, Agent, or Firm—Davis, Bujold & Streck

[57] ABSTRACT

A windrow mover having a frame with a linkage arm on each side. Each of the linkage arms having a first end pivotally attached near the front of and at a point on the axis of the frame. An axle is attached to a second end of each linkage arm defining an axis. Ground engaging wheels are mounted on each of the axles, thereby permitting movement of the frame over a groundsurface. A hydraulic cylinder is provided for moving the linkage arm such that the axis of the frame moves in a substantially vertical plane radially about the axis of the wheels as defined by the axle, thereby altering the spacial relationship between the frame and the wheels from an operative position where the front of the frame is adjacent the groundsurface to a transport position where the front of the frame is spaced from the groundsurface.

11 Claims, 9 Drawing Sheets

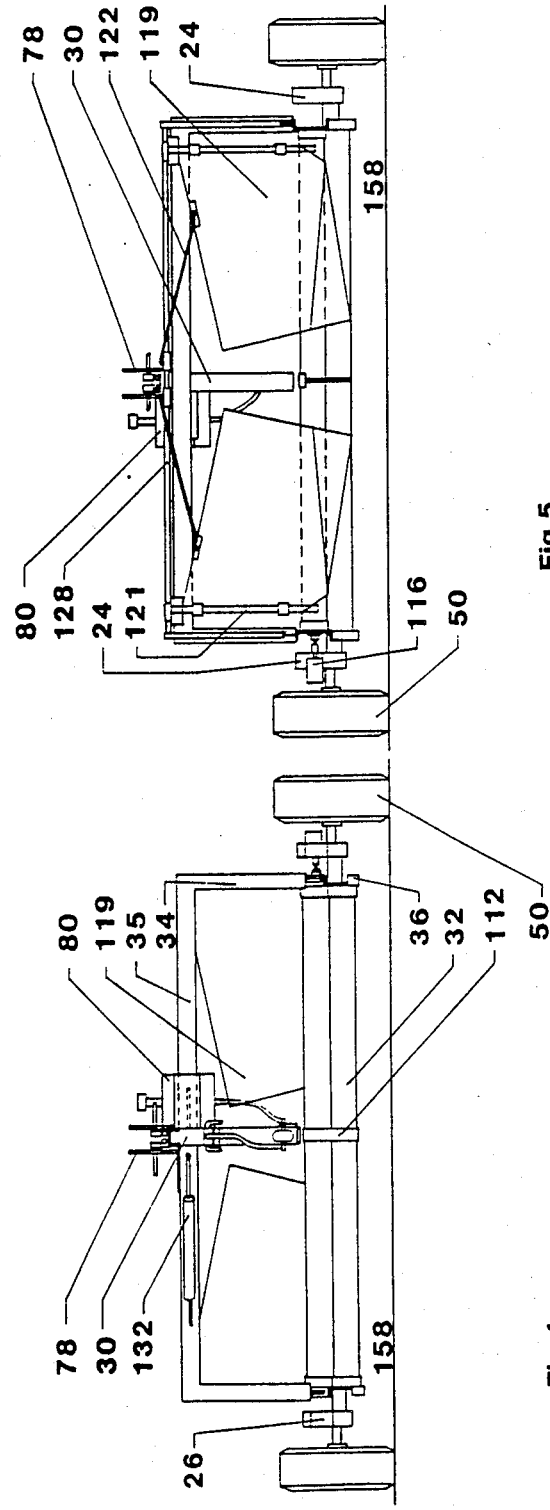

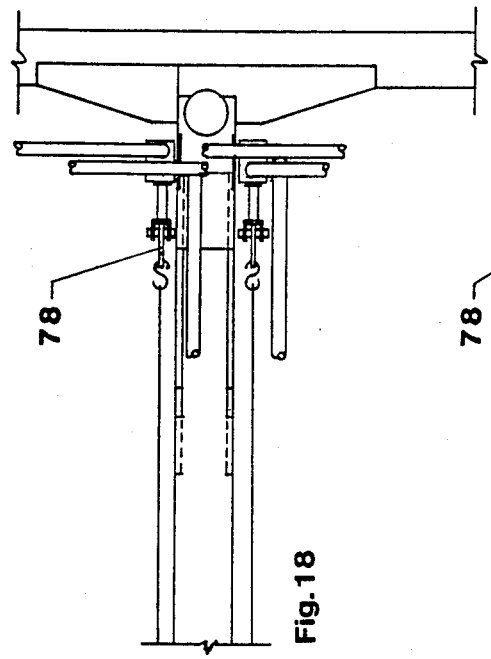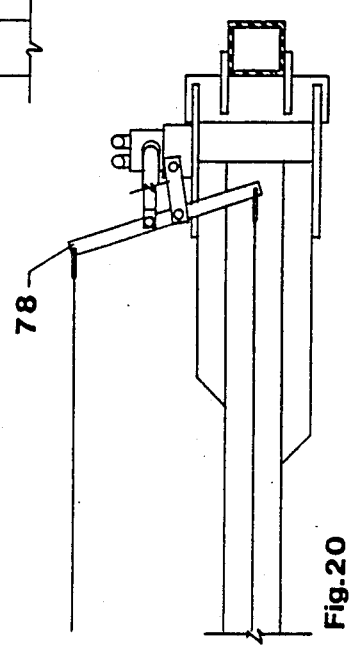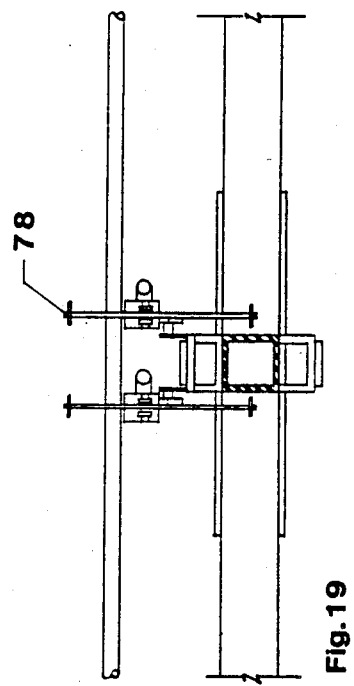

WINDROW MOVER

BACKGROUND OF THE INVENTION

When cereal grains are harvested, they are left in the field in windrows to dry. Not infrequently, it rains or snows upon the windrows. When this occurs the surface of the windrow is dried by the sun within a few days, however the bottom of the windrow may remain moist for a prolonged period. Excess moisture tends to adversely effect the quality of crop yield. In order to alleviate such conditions a windrow mover is used. A windrow mover is an apparatus which picks up the windrow and moves it to a new location. It is important that the relative order of the windrow be maintained during this movement or the heads of the grain will be lost.

Windrow movers are constructed with a pick up platform upon which belts are mounted attached to the frame forward of the wheels. The pick up platform is pivotally attached to the frame such that the front of the platform may be set a preselected distance above the groundsurface. The spacing between the front of the pick up platform and the wheels makes it impossible to maintain the pick up a constant distance from the groundsurface when operating on uneven terrain.

Windrow movers are constructed with pick up platforms which have a plurality of narrow belts mounted on rollers. Ironically, this construction does not permit windrow movers to function when the windrow is too wet. This, of course, is when the apparatus is most needed. When the windrow is too wet, it tends to cling together in clumps. These clumps build up between the belts and rollers of the pick up, leading to slippage and breakage of the belts.

SUMMARY OF THE INVENTION

What is required is a windrow mover which can be adjusted during operation to alter the relative spacing between the groundsurface and the front of the pick up.

According to this aspect of the invention there is provided, a windrow mover which is comprised of a frame having a front, a back and opposed sides. A linkage arm is provided on each of the sides, each of the linkage arms having a first end pivotally attached near the front of and at a point on the axis of the frame, and a second end. An axle is attached to the second end of each linkage arm defining an axis. Ground engaging wheels are mounted on each of the axles, thereby permitting movement of the frame over a groundsurface. Means for moving the linkage arm is provided such that the axis of the frame moves in a substantially vertical plane radially about the axis of the wheels as defined by the axle, thereby altering the spacial relationship between the frame and the wheels from an operative position where the front of the frame is adjacent the groundsurface to a transport position where the front of the frame is spaced from the groundsurface. A coupling arm is provided having one end connected to the front of the frame, and an opposed end having a connecting coupling thereby permitting coupling to a tow vehicle. At least one set of rollers are rotatably mounted to the frame. A plurality of belts are mounted on the rollers, the belts having means for picking up windrows extending therefrom. Means to drive the rollers are mounted on the frame and engaged with at least one of the rollers.

What is required is a windrow mover which is configured to prevent the entry of debris between the belts and rollers of the pick up.

According to this aspect of the invention there is provided, a windrow mover which is comprised of a frame having a front, a back and opposed sides. Ground engaging wheels are mounted on each side of the frame, thereby permitting movement of the frame over a groundsurface. A coupling arm is provided having one end connected to the front of the frame, and an opposed end having a connecting coupling thereby permitting coupling to a tow vehicle. At least one set of rollers are rotatably mounted to the frame, each set of rollers supporting a single belt having peripheral edges and means for picking up windrows extending therefrom. Each roller has a central crown portion and opposed ends, and is tapered from the crown portion toward the ends. A guard extends from the edges of the frame which overlaps the peripheral edges of each belt such that entry of debris under the belt is inhibited. Means to drive the rollers is provided which is mounted on the frame and engaged with at least one of the rollers.

Although beneficial results may be obtained using the windrow mover having either one of the features described, even more beneficial results may be obtained by combining the features.

Although beneficial results may be obtained by using the windrow mover with the combined features described above even more beneficial results may be obtained by modifying the axle to permit angular adjustment of the axis of the wheel such that the front of the frame may be offset from the direction of travel of the wheels. This may be accomplished by adding the preferred feature of an axle which is generally "L" shaped having a first end on which the wheel is rotatably mounted, and a second end journalled for limited rotational movement in the second end of the linkage arm. The second end defines a substantially vertical axis when the linkage arm is in the operative position, such that rotation of the second end of the axle results in the axis of first end of the axle moving in a substantially horizontal plane radially about the vertical axis thereby altering the angular relationship between the axis of the wheels and the axis of the frame such that the front of the frame is offset from the direction of travel of the wheels.

BRIEF DESCRIPTION OF THE DRAWINGS

These and other features of the invention will become more apparent from the following description in which reference is made to the appended drawings, wherein:

FIG. 4 is a front elevation view of the windrow mover illustrated in FIG. 1.

FIG. 5 is a rear elevation view of the windrow mover illustrated in FIG. 1.

FIG. 18 is a detailed top plan view of the hydraulic controls of the windrow mover illustrated in FIG. 1.

FIG. 19 is a detailed front elevation view of the hydraulic controls of the windrow mover illustrated in FIG. 1.

FIG. 20 is a detailed side elevation view of the hydraulic controls of the windrow mover illustrated in FIG. 1.

DETAILED DESCRIPTION OF THE PREFERRED EMBODIMENT

Figure 1:
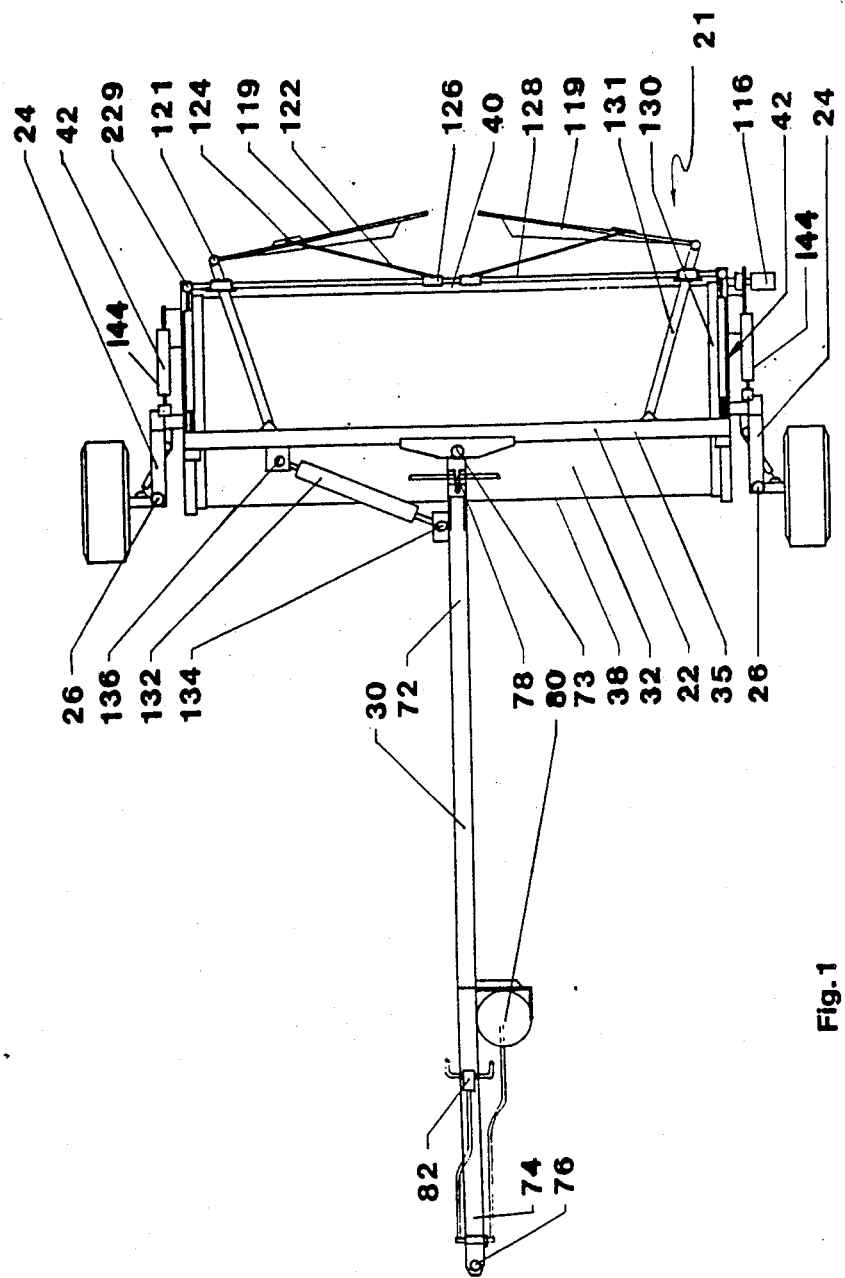
FIG. 1 is a top plan view of a preferred embodiment of the windrow mover.

The preferred embodiment will now be described with reference to FIGS. 1 through 20. The preferred embodiment, generally designated by reference numeral 21, is a windrow mover.

The primary components of windrow mover 21, as illustrated in FIG. 1, are a frame 22, a linkage arm 24, an axle assembly 26, a coupling arm 30 and a belt and roller assembly 32.

Figure 3:
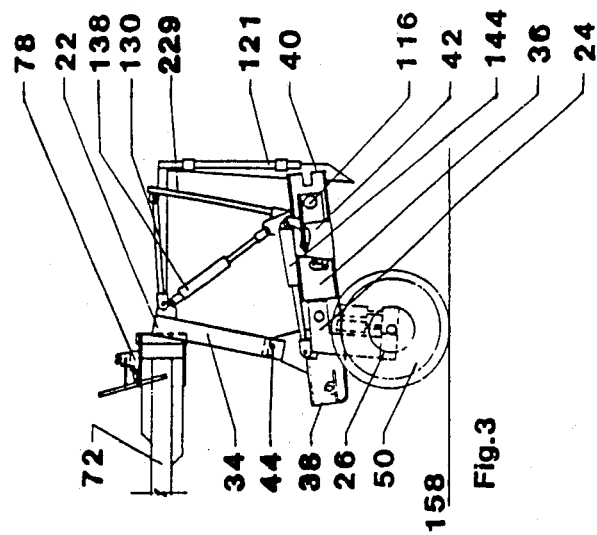
FIG. 3 is a side elevation view of the windrow mover illustrated in FIG. 1 in a transport position.
Figure 2:
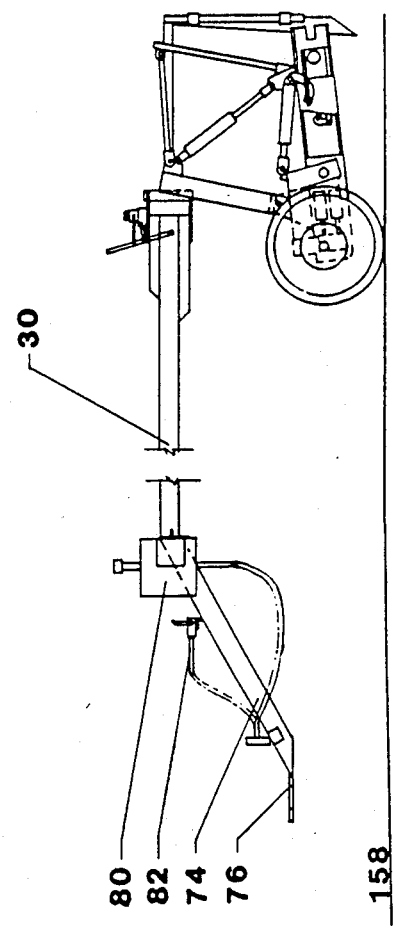
FIG. 2 is a side elevation view of the windrow mover illustrated in FIG. 1 in an operative position.
Figure 6:
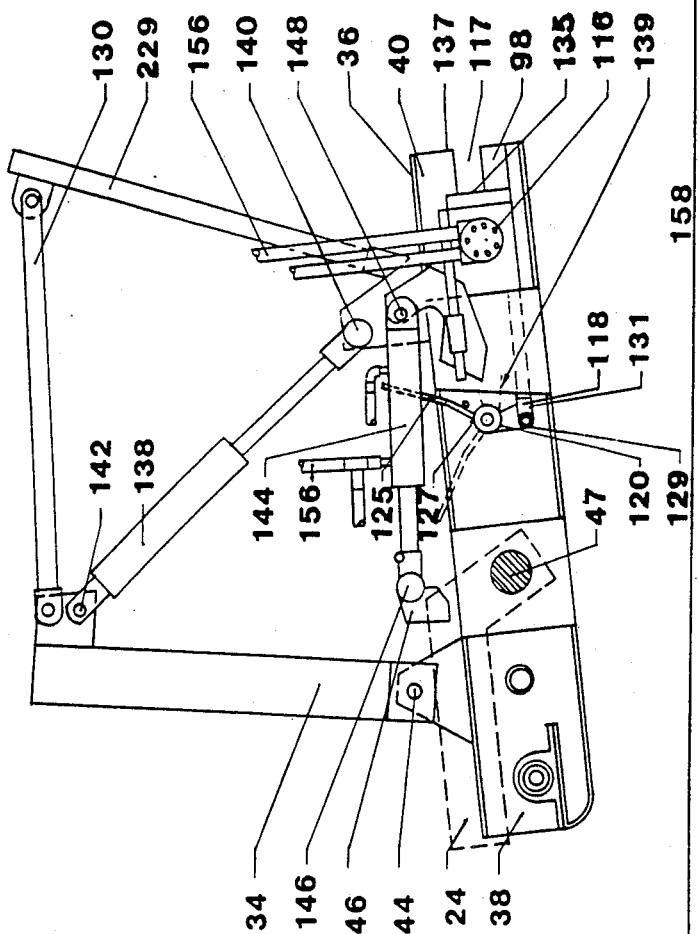
FIG. 6 is a detailed side elevation view of the frame of the windrow mover illustrated in FIG. 1.

As illustrated in FIGS. 2, 3 and 6 frame 22 has a vertical portion 34 and a horizontal pick up portion 36. For the purpose of this description frame 22 can be said to have a front 38, a back 40 and opposed sides 42. Vertical portion 34 and pick up 36 are pivotally connected at connection 44 at front 38 of frame 22. Vertical portions 34 are connected by a horizontally extending beam 35.

A linkage arm 24 is attached on each of sides 42 of frame 22. Linkage arm 24 is best illustrated in FIGS. 12 through 17. Each linkage arm 24 is generally "L" shaped defining a heel 46. Each linkage arm 24 has a first end 48 and a second end 52. First end 48 is attached near front 38 of frame 22 to shaft 47 which defines an axis of frame 22 and permits pivotal movement of linkage arm 24. Second end 52 is attached to axle assembly 26 on which ground engaging wheels 50 are rotatably mounted defining an axis for wheels 50.

As best illustrated in FIGS. 12 through 17, axle assembly 26 has an axle 58 which is generally "L" shaped having a first end 60 on which the ground engaging wheel 50 is rotatably mounted, and a second end 62 journalled for limited rotational movement in bushing 68 which is attached to second end 52 of the linkage arm 24. Second end 62 of axle 58 is secured against removal from bushing 68 by lock nut 70.

Coupling arm 30 extends from front 38 of frame 22 and has one end 72 pivotally connected at connection 73 to horizontal beam 35, and an opposed end 74. Opposed end 74 has a connecting coupling 76. Attached to coupling arm 30 are components 78, 80, and 82; the structure and operation of which will be hereinafter described.

Figure 9:
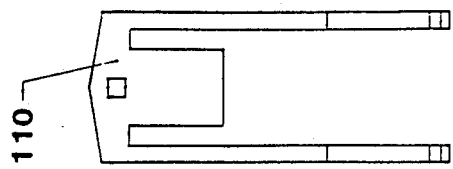
FIG. 9 is a detailed top plan view of one of the forks on the belt of the windrow mover illustrated in FIG. 7.
Figure 8:
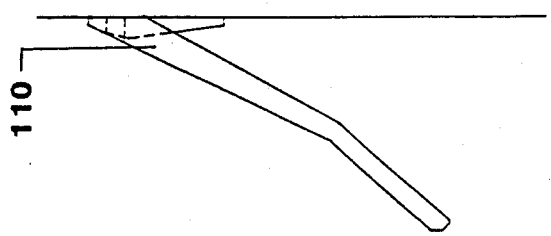
FIG. 8 is a detailed side elevation view of one of the forks on the belt of the windrow mover illustrated in FIG. 7.
Figure 7:
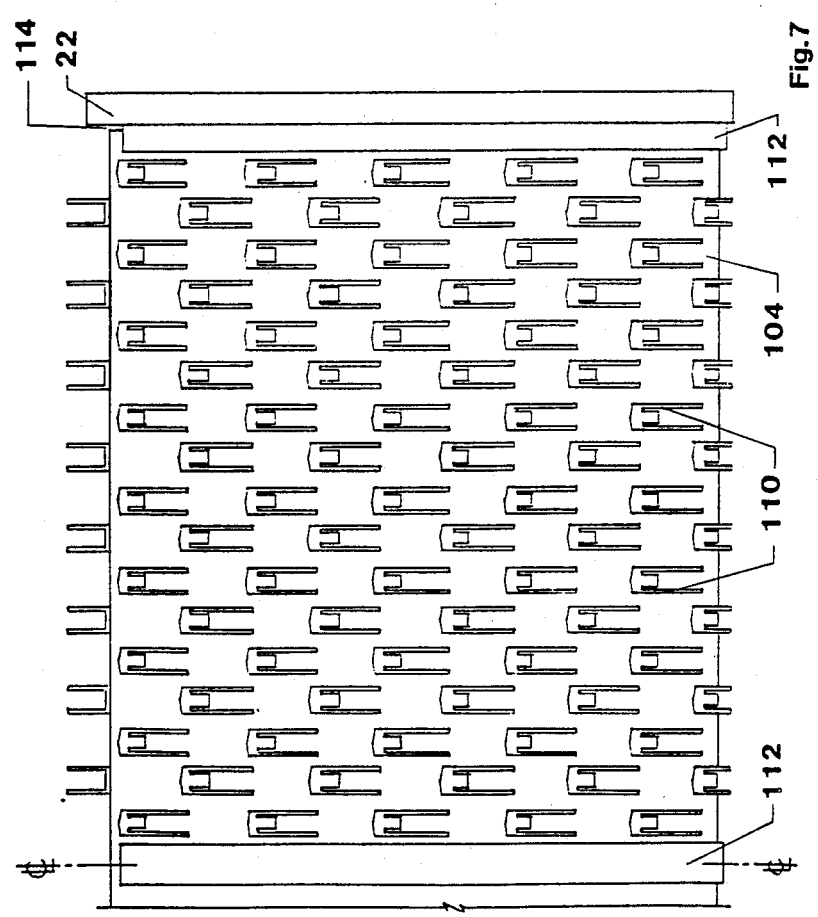
FIG. 7 is a detailed top plan view of the belt of the windrow mover illustrated in FIG. 1.
Figure 11:
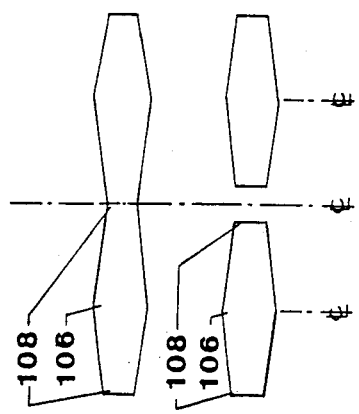
FIG. 11 is a detailed top plan view of the rollers illustrated in FIG. 10.
Figure 10:
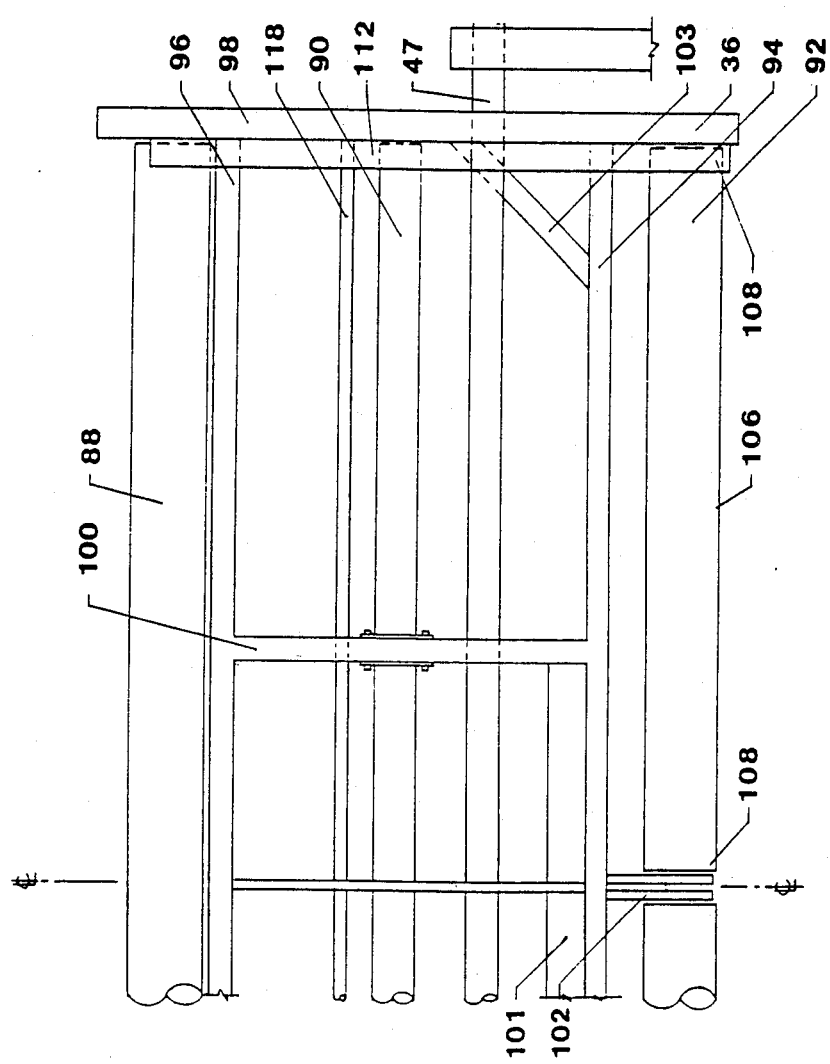
FIG. 10 is a detailed top plan view of the rollers of the windrow mover illustrated in FIG. 1.
Figure 15:
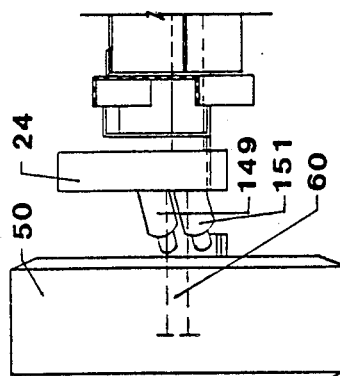
FIG. 15 is a detailed rear elevation view of the right side wheel mounting of the windrow mover illustrated in FIG. 1.
Figure 14:
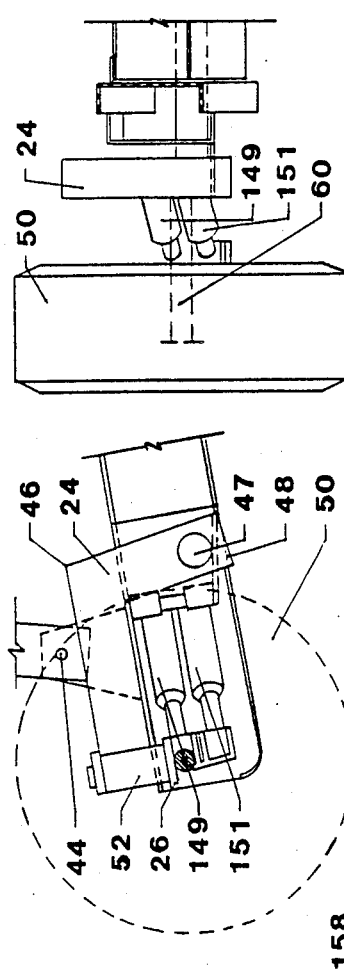
FIG. 14 is a detailed side elevation view of the right side wheel mounting of the windrow mover illustrated in FIG. 1.
Figure 12:
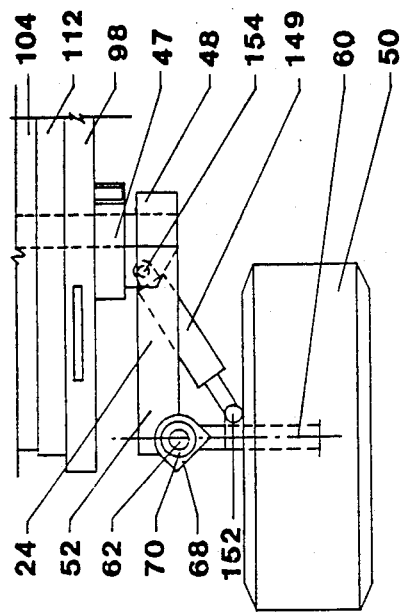
FIG. 12 is a detailed top plan view of the right side wheel mounting of the windrow mover illustrated in FIG. 1.
Figure 13:
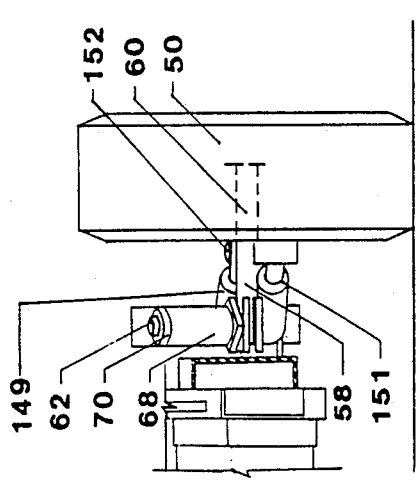
FIG. 13 is a detailed front elevation view of the right side wheel mounting of the windrow mover illustrated in FIG. 1.
Figure 17:
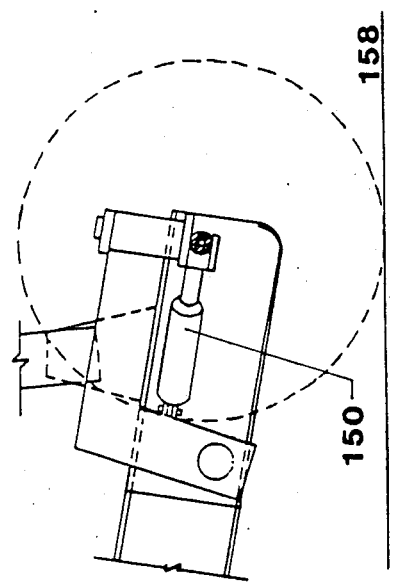
FIG. 17 is a detailed rear elevation view of the left side wheel mounting of the windrow mover illustrated in FIG. 1.
Figure 16:
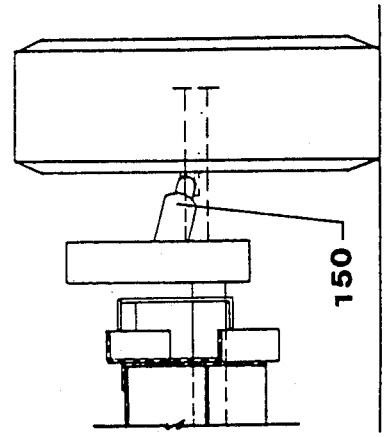
FIG. 16 is a detailed side elevation view of the left side wheel mounting of the windrow mover illustrated in FIG. 1.

Belt and roller assembly 32 is best illustrated in FIGS. 7 and 10. There are two belts 104 each of which are carried by rollers 88, 90, and 92 rotatably mounted to pick up 36 of frame 22. There is a single driver roller 88 which supports both of belts 104. There are three carrier rollers 90 and two driven rollers 92. The support structure of pick up 36, as illustrated in FIG. 10, consists of a front support 94, a back support 96, and side supports 98. A strengthening brace 100 extends between front support 94 and back support 96 on each side of pick up 36. A corner brace 103 is positioned where front support 94 and side support 98 join. A stiffening bar 101 extends transversely between respective braces 100. A mounting support 102 is positioned at approximately the mid-point of front support 94. Side supports 98 extend out beyond supports 94 and 96. Carrier rollers 90 are mounted between respective braces 100 and between each of braces 100 and side supports 98. Driver roller 88 is mounted at back 40 of pick up 36 parallel to back support 96 between respective side supports 98. Driven rollers 92 are mounted at front 38 of pick up 36 of frame 22 parallel to front support 94 between side supports 98 and mounting support 102. Rollers 92 have a central crown portion 106 are tapered from crown portion 106 toward ends 108. Roller 88 which supports two belts has two crown portions 106. The crown portions are very important, the purpose and operation of the same will be hereinafter further described. Each of belts 104 has a plurality of pick up forks 110 extending therefrom. Pick up forks 110 are best illustrated in FIGS. 8 and 9. A guard 112 in the form of a plate is attached mounting support 102 and each of side supports 98. Guard 112 overlaps the peripheral edges 114 of the belt 104. Driver roller 88 is mounted in a pair of longitudinal slots 117 positioned in each of side supports 98. Connected to driver roller 88 is an orbit motor 116. Each of slots 117 has a first end 135 remote from back 40 of frame 22 and a second end 137 adjacent back 40 of frame 22. A belt tightening assembly 139 is provided which consists of a link 120, a connecting rod 118 and a hand lever 125. Link 120 has a first end 127 and a second end 129. First end 127 is pivotally attached to one of side supports 98 of frame 22 spaced from one of slots 117. Connecting rod 118 has one end 131 pivotally connected to second end 129 of link 120 and an opposed end (not shown) which is connected to roller 88. Hand lever 125 is secured to link 120.

Deflectors 119 are mounted at back 40 of frame 22 to a movable support structure consisting of supports 121, 122, and 131. The movable supports are in turn supported by a fixed support structure consisting of supports 128, 229 and 130. Movable supports 122 are adjustable as they have one end 124 attached to deflectors 119 and the other end 126 slidingly engaged with fixed support member 128. If desired, a further adjustment may be made as movable support members 131 are also adjustable by sliding along fixed support member 128. Fixed support members 130 are secured to vertical portion 34 of frame 22, while fixed supports 229 are secured to pick up 36. Movable support members 131 are pivotally secured to horizontal beam 35.

A hydraulic control system is provided to enable adjustments to be made from a tow vehicle such as a tractor. A hydraulic cylinder 132 is provided to operate coupling arm 30. Hydraulic cylinder 132 has one end 134 attached to coupling arm 30 and an opposed end 136 attached to horizontal beam 35 of frame 22. A hydraulic cylinder 138 is provided to pivot back 40 of frame 22 about pivot connection 44. Hydraulic cylinder 138 has one end 140 attached to pick up 36 of frame 22 adjacent back 40, and an opposed end 142 attached to vertical portion 34 of frame 22. A hydraulic cylinder 144 is provided to move linkage arm 24. Hydraulic cylinder 144 has one end 146 attached to heel 46 of linkage arm 24 and an opposed end 148 attached to pick up 36 of frame 22 adjacent back 40. Three hydraulic cylinders 149, 150, and 151 are provided to control the movement of axles 58. Hydraulic cylinders 149, 150 and 151 have one end 152 attached to first end 60 of axle 58 and an opposed end 154 attached to pick up 36 of frame 22. Hydraulic cylinders 149 and 150 each control the movement of one of axles 58. Hydraulic cylinder 151 links hydraulic cylinders 149 and 150 so that movement of one of axles 58 upon activation of hydraulic cylinder 149 results in like movement of the other of axles 58 by hydraulic cylinder 150 as a result of the linkage with hydraulic cylinder 151. For further clarification, it will be understood that hydraulic cylinder 149 indirectly controls both of axles 58 as hydraulic fluid flows via hydraulic cylinder 151 from hydraulic cylinder 149 to hydraulic cylinder 150. All of the hydraulic cylinders 132, 138, 144, and 149 are connected by tubing 156 to manual controls 78. A reservoir 80 for hydraulic fluid is mounted to coupling arm 30. All hydraulic components are operated through controls 78 with the exception system of orbit motor 116. A separate hydraulic control 82 is required to control the speed of orbit motor 116. Controls 78 and 82 are connected by cables to the tow vehicle (not shown) to enable all functions to be controlled from the tow vehicle.

The operation of windrow mover 21 will now be described with reference to FIGS. 1 through 20. In the description reference will be made to a groundsurface 158 and a tow vehicle (not shown). Prior to operation, connecting coupling 76 at end 74 of coupling arm 30, as illustrated in FIG. 1, is attached to a tow vehicle such as a tractor. Controls 78 and 82 are connected to the tractor in order that hydraulic cylinders 132, 134, 144, 149, together with orbit motor 116 may be activated without dismounting from the tow vehicle. Belts 104 have a tendency to contract when wet. For this reason is preferable if tension is taken off belts 104 after every use. This is accomplished by using the preferred feature of belt tightening assembly 139, as illustrated in FIG. 6. Upon a force being exerted on lever 125 belt tightening assembly 139 is urged from a first position where driver roller 88 is at first end 135 of slot 117, to a second position 137 where rod 118 forces driver roller 88 as far toward second end 137 of slot 117 as the presence of belts 104 will permit. This tightens belts 104. Once belts 104 are engaged with rollers 88, 90, and 92 so as to avoid slippage windrow mover 21 is ready for use. Deflectors 119, as illustrated in FIG. 5, are preset by altering movable supports 122 and 131 in place deflectors 119 at an angle to force the windrow together so it does not become too widely spread as it comes off back 40 of pick up 36 of frame 22.

Referring to FIGS. 2 and 3, the relative spacing between groundsurface 158 and front 38 of frame 22 may be adjusted by activating hydraulic cylinder 144. This adjustment places belts 104 in a position adjacent groundsurface 158 where forks 110 can engage a windrow. Upon activation of hydraulic cylinder 144 end 146 of hydraulic cylinder 144 acts upon heel 46 of linkage arm 24 such that the axis of the frame as defined by shaft 47 moves in a substantially vertical plane radially about the axis of the wheel 50 as defined by end 60 of axle 58 thereby altering the spacial relationship between frame 22 and wheels 50 from an operative position where front 38 of frame 22 is adjacent groundsurface 158 to a transport position where front 38 of frame 22 is spaced from groundsurface 158. The operative position is illustrated in FIG. 2, and the transport position is illustrated in FIG. 3.

Referring to FIG. 6, the angle of pick up 36 of frame 22 may be adjusted by activating hydraulic cylinder 138. This adjustment effects the trajectory of the windrow as it is moved by forks 110 of belts 104 from front 38 of pick up 36 of frame 22 and is propelled by the movement of belt 104 off back 40. Upon activation of hydraulic cylinder 138 ends 140 and 142 of hydraulic cylinder 138 are drawn together. Vertical portion 34 of frame 22 is fixed and consequently the movement of hydraulic cylinder 138 elevates back 40 of pick up 36 of frame 22.

Referring to FIGS. 12 through 17, the angular relationship between the axis of wheels 50 as defined by end 60 of axle 58 and the axis of frame 22 as defined by shaft 47 can be adjusted by activating hydraulic cylinder 149. Any adjustment of hydraulic cylinder 149 results in a like adjustment of hydraulic cylinder 150 as hydraulic cylinder 151 links the two cylinders making cylinder 150 the "slave" of 149. This adjustment causes front 38 of frame 22 to be offset from the direction of travel of wheels 50 in order that the windrow may be moved laterally, rather than being returned to its previous location. This should only be done when linkage arm 24 is in an operative position. When linkage arm 24 is in the operative position second end 62 of axle 58 defines a substantially vertical axis. Upon activation of hydraulic cylinder 149 end 152 of hydraulic cylinder 149 acts upon second end 62 of axle 58. The rotation of second end 62 of axle 58 results in first end 60 moving in a substantially horizontal plane radially about the vertical axis defined by end 62, thereby altering the angular relationship between the axis of wheels 50 as defined by end 60 and the axis of the frame 22 as defined by shaft 47. Of course, because of the linkage between hydraulic cylinder 149 and cylinder 150, cylinder 150 performs a like movement on the other of wheels 50.

Referring to FIG. 1, the angular relationship between coupling arm 30 and frame 22 may be adjusted by activating hydraulic cylinder 132. This adjustment permits steering of frame 22 in order that windrow mover 21 may be operated on either side of the tow vehicle or directly behind. This is a particular advantage when the wheel base of the tow vehicle is not sufficiently wide to enable the tow vehicle to "straddle" the windrows. Upon activation of hydraulic cylinder 132 end 134 exerts a force upon coupling arm 30, thereby steering windrow mover 21.

As windrow mover 21 is towed down the field the operator of the tow vehicle can make such adjustments as are dictated by the condition of the field. The field will often be muddy or have surface water in low lying areas. Hydraulic cylinder 144 will be activated to adjust front 38 to the correct height to enable forks 110 of belts 104 to engage the windrows. Hydraulic cylinder 138 will be activated to alter the trajectory of the windrow. Hydraulic cylinder 150 will be activated to enable the operator to direct the placement of the windrow away from a wet or muddy area. Hydraulic cylinder 132 will be activated in order to steer windrow mover 21 into areas which are too muddy to have the tow vehicle drive through. The windrow is picked up by forks 110, carried along belts 104 and moved from front 38 of pick up 36 to back 40.

Referring to FIG. 7, guard 112 overlays the peripheral edges 114 of belts 104 to prevent the entry of debris between rollers 88, 90, and 92 and belts 104. It is only possible to use guard 112 because belts 104 are wide. Prior art devices used a plurality of narrow belts. The reason narrow belts were used is that wide belts did not properly engage the underlying rollers and as such were subject to movement. Windrow mover 21 can successfully use wide belts due to the presence of crown 106 on the rollers, especially rollers 88 and 92. Crown 106 are not readily discernable from FIG. 10, the reason being that the crown is very slight. By way of example of a roller 40 inches in length and 5¼ inches in diameter, the variance between crown 106 and ends 108 need only be ⅛ of an inch. Crowns 106 are shown in a somewhat exaggerated representation in FIG. 11. It should be noted that as driver roller 88 supports two of belts 104, it has two crowns 106. Crowns 106 need only be sufficient to increase the friction maintaining belts 104 on the rollers when belts 104 are subjected to a transverse force. If the diameter of crown 106 is too great a deviation from the diameter of ends 108, peripheral edges 114 of belts 104 do not adhere to ends 108 and this results in wear on peripheral edges 114.

It will be apparent to one skilled in the art that having wheels 50 at front 38 of pick up 36 of frame 22 permits windrow mover 21 to move over uneven terrain as wheels 50 maintain a constant spacing from groundsurface 158. This is made possible by utilizing linkage arms 24 to permit height adjustment of front 38 of frame 22. With prior art devices the wheels were spaced a distance back from front 38 of frame 22, resulting in variable spacing when approaching or descending an incline.

It will be apparent to one skilled in the art that windrow mover 21 as described is capable of operating in extremely wet conditions which would cause a prior art device to accumulate debris under their belts resulting in slippage or breakage of the belts. This has been accomplished by replacing a plurality of smaller belts approximately 22 inches wide prevalent in the prior art with two of belts 104 which in the proto-type were 4 feet 6 inches wide, over twice as wide. Belts 104 can operate due to the unique construction of rollers 88, 90, and 92 utilizing a crown portion 106, which tapers toward ends 108. The wider belts 104 enables measures to be taken to prevent debris from getting under the peripheral edges 114 of belt 104. In the preferred embodiment guard 112 is in the form of a covering plate.

It will further be apparent to one skilled in the art that the preferred features enable a tremendous flexibility to the operator in terms of the adjustments which are possible to adapt to prevailing conditions at the time of use.

It will finally be apparent to one skilled in the art that having an understanding of the teachings of the disclosure and the substance of the invention modifications can be made to the preferred embodiment without departing from the invention.

The embodiments of the invention in which an exclusive property or privilege is claimed are defined as follows:

1. A windrow mover, comprising:
   a. a rigid frame having a front, a back and opposed sides;
   b. a linkage arm on each of the sides, each of the linkage arms having a first end pivotally attached on a common horizontal axis near the front of the frame, and a second end;
   c. an axle attached to the second end of each linkage arm defining a horizontal axis;
   d. ground engaging wheels mounted on each of the axles, thereby permitting movement of the frame over a groundsurface;
   e. means for moving the linkage arm such that the axis of the frame as defined by the pivotal connection at the first end of each linkage arm moves in a substantially vertical plane radially about the axis of the wheels as defined by the axle, thereby altering the spacial relationship between the frame and the wheels from an operative position where the front of the frame is adjacent the groundsurface to the transport position where the frame is spaced from the groundsurface;
   f. a coupling arm having one end connected to the front of the frame, and an opposed end having a connecting coupling thereby permitting coupling to a tow vehicle;
   g. at least one set of rollers rotatably mounted to the frame;
   h. at least one belt mounted on the rollers, each belt having peripheral edges and means for picking up windrows extending therefrom; and
   i. means to drive the rollers mounted to the frame engaged with at least one of the rollers.

2. A windrow mover as defined in claim 1, the linkage arm being generally "L" shaped defining a heel, the means for moving the linkage arm acting upon a point adjacent the heel.

3. A windrow mover as defined in claim 1, the axle being generally "L" shaped having a first end on which the wheel is rotatably mounted, and a second end journalled for limited rotational movement in the second end of the linkage arm and defining a substantially vertical axis when the linkage arm is in the operative position, such that rotation of the second end of the axle results in the first end of the axle moving in a substantially horizontal plane radially about the vertical axis thereby altering the angular relationship between the axis of the wheels and the axis of the frame such that the front of the frame is offset from the direction of travel of the wheels.

4. A windrow mover as defined in claim 3, having hydraulic connections to each wheel linked by an intermediate hydraulic connection such that the movement of one wheel results in like movement of the other wheel.

5. A windrow mover as defined in claim 1, having at least one set of rollers, each set of rollers supporting a single belt, each roller having a central crown portion and opposed ends, each roller being tapered from the crown portion toward the ends.

6. A windrow mover as defined in claim 1, having a guard attached to the frame which overlaps the peripheral edges of each of the belt such that entry of debris under the belt is inhibited.

7. A windrow mover as defined in claim 1, the pick up means being forks.

8. A windrow mover as defined in claim 1, the front of the frame having a pivotal connection whereby the back of the frame may be elevated.

9. A windrow mover as defined in claim 1, deflectors being mounted to the back of the frame.

10. A windrow mover as defined in claim 1,
   a. the sides of the frame each having a longitudinal slot at one end, the slot having a first end remote from the peripheral edge of the frame and a second end adjacent the peripheral edge of the frame;
   b. one of the rollers being mounted in the slots; and
   c. a belt tightening assembly comprising a link having a first end and a second end, the first end being pivotally attached to one side of the frame spaced from one of the slots, a rod having one end pivotally connected to the second end of the link and an opposed end which is connected to the roller mounted in the slot, a lever secured to the link such that upon a force being exerted on the lever the belt tightening assembly is urged from a first position where the roller is at the first end of the slot to a second position where the rod forces the roller as far toward the second end of the slot as the presence of the belt will permit.

11. A windrow mover, comprising:
   a. a frame having a front, a back and opposed sided, the front of the frame having a pivotal connection whereby the back of the frame may be elevated;
   b. a linkage arm on each of the sides being generally "L" shaped defining a heel, each of the linkage arms having a first end pivotally attached near the front of and at a point on the axis of the frame, and a second end on which ground engaging wheels are rotatably mounted thereby defining an axis and permitting movement of the frame over a groundsurface;
   c. means for moving the linkage arm acting upon a point adjacent the heel such that the axis of the frame moves in a substantially vertical plane radially about the axis of the wheel thereby altering the spacial relationship between the frame and the wheels from an operative position where the front of the frame is adjacent the groundsurface to a transport position where the front of the frame is spaced from the groundsurface;
   d. an axle attached to the second end of each linkage arm, the axle being generally "L" shaped having a first end on which the ground engaging wheel is rotatably mounted, and a second end journalled for limited rotational movement in the second end of the linkage arm and defining a substantially vertical axis when the linkage arm is in the operative position, such that rotation of the second end of the axle results in the first end of the axle moving in a substantially horizontal plane radially about the vertical axis thereby altering the angular relationship between the axis of the wheels and the axis of the frame such that the front of the frame is offset from the direction of travel of the wheels;
   e. a coupling arm having one end connected to the front of the frame, and an opposed end having a connecting coupling thereby permitting coupling to a tow vehicle;
   f. at least one set of rollers rotatably mounted to the frame, each roller having a central crown portion and opposed ends, each roller being tapered from the crown portion toward the ends;
   g. a single belt mounted on each set of rollers, each belt having peripheral edges and forks for picking up windrows extending therefrom;
   h. means to drive the rollers mounted to the frame and engaged with at least one of the rollers;
   i. a guard attached to the frame which overlaps the peripheral edges of each belt such that entry of debris under the belt is inhibited; and
   j. deflectors mounted to the back of the frame.

* * * * *